US012762293B2

(12) United States Patent
Howard et al.

(10) Patent No.: US 12,762,293 B2
(45) Date of Patent: Oct. 13, 2026

(54) INTEGRATED INSTRUSION DETECTION FOR ENHANCED CHASSIS SECURITY

(71) Applicant: Dell Products L.P., Round Rock, TX (US)

(72) Inventors: Anthony Wayne Howard, Austin, TX (US); Isaac Qin Wang, Austin, TX (US); David William Grunow, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 142 days.

(21) Appl. No.: 18/789,952

(22) Filed: Jul. 31, 2024

(65) Prior Publication Data

US 2026/0037679 A1 Feb. 5, 2026

(51) Int. Cl.
*G06F 21/86* (2013.01)
*G06F 21/78* (2013.01)

(52) U.S. Cl.
CPC .............. *G06F 21/86* (2013.01); *G06F 21/78* (2013.01)

(58) Field of Classification Search
CPC .......... G06F 21/86; G06F 1/181; G06F 21/81; G06F 21/78; G06F 21/70; G06F 2221/034
See application file for complete search history.

(56) References Cited

U.S. PATENT DOCUMENTS 8,278,948 B2 * 10/2012 Johnson ............. G08B 13/1418 340/568.1
8,884,757 B2 * 11/2014 Sasson .................... G06F 21/86 340/687
9,892,293 B1 * 2/2018 Wade ...................... G06F 21/86
10,306,753 B1 * 5/2019 Fadden ................... G06F 21/00
12,363,838 B2 * 7/2025 Brubacher ............ G01S 5/0009
(Continued)

FOREIGN PATENT DOCUMENTS

CN 219266380 U * 6/2023
WO WO-0163994 A2 * 8/2001 ........... H05K 5/0208
WO WO-2017033175 A1 * 3/2017 ........... G06K 7/0013

OTHER PUBLICATIONS

P. Staat, J. Tobisch, C. Zenger and C. Paar, "Anti-Tamper Radio: System-Level Tamper Detection for Computing Systems," 2022 IEEE Symposium on Security and Privacy (SP), San Francisco, CA, USA, 2022, pp. 1722-1736 (Year: 2022).*

*Primary Examiner* — Zhimei Zhu
(74) *Attorney, Agent, or Firm* — WOMBLE BOND DICKINSON (US) LLP

(57) ABSTRACT

Methods, systems, and devices for integrated intrusion detection for enhanced chassis security for a chassis of a data processing system. To do so, a detection mechanism may be used to identify an intrusion into the chassis. The intrusion into the chassis may be monitored using a flow path of the detection mechanism. This flow path may include a first portion and a second portion, each being attached to respective portions of the chassis that are at least partially detachable from one another. While the respective portions of the chassis are attached or detached, the first portion and the second portion may be electrically connected or disconnected, respectively. In an instance of the monitoring where the intrusion is identified, an action set to mitigate risk of undesired operation of the data processing system due to the intrusion may be performed based on a policy keyed to the intrusion.

20 Claims, 15 Drawing Sheets

(56) References Cited

U.S. PATENT DOCUMENTS

| | | | | |
|---|---|---|---|---|
| 2013/0015972 | A1* | 1/2013 | Sasson | G06F 21/86 340/540 |
| 2013/0082721 | A1* | 4/2013 | Johnson | G08B 13/1418 324/691 |
| 2015/0128297 | A1* | 5/2015 | Mirkazemi-Moud | G06F 1/1684 726/34 |
| 2018/0330132 | A1* | 11/2018 | Yanko | G06K 7/0013 |
| 2022/0075869 | A1* | 3/2022 | Aguayo Gonzalez | G06F 21/755 |
| 2022/0327249 | A1* | 10/2022 | Kulkarni | G11C 5/14 |
| 2023/0079418 | A1* | 3/2023 | Hamilton | H04L 63/1408 726/22 |
| 2023/0121936 | A1* | 4/2023 | Hobbs | G06F 1/183 713/300 |
| 2024/0357754 | A1* | 10/2024 | Brubacher | H05K 5/0208 |

* cited by examiner

INTEGRATED INSTRUSION DETECTION FOR ENHANCED CHASSIS SECURITY

FIELD

Embodiments disclosed herein relate generally to management of data processing systems. More particularly, embodiments disclosed herein relate to systems and methods for managing security of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
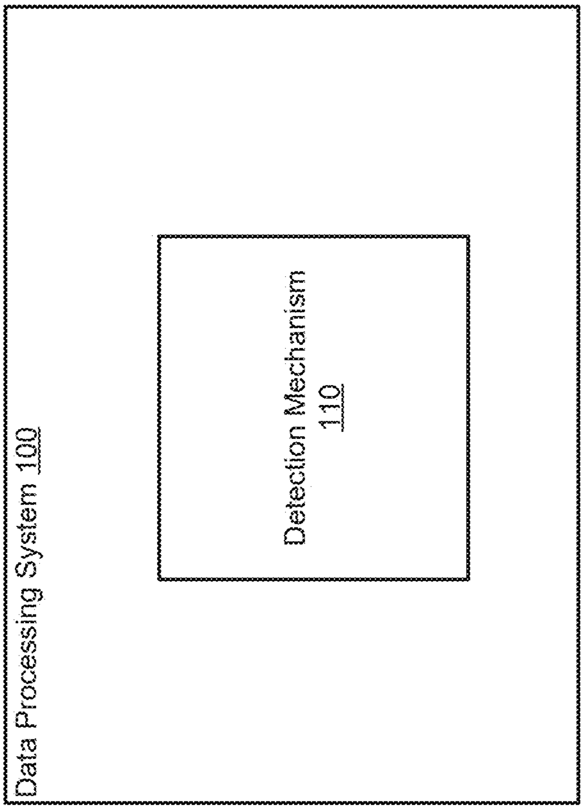
FIG. 1A-1B show block diagrams illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operations of data processing systems that may provide, at least in part, computer implemented services. The computer implemented services may be provided to any type and/or number of other devices and/or users of the data processing systems. Furthermore, the provided computer implemented services may be of any quantity and/or type of such services.

To provide the computer implemented services, a distributed system may include any number of data processing systems that may each include any quantity of hardware resources. These hardware resources may include hardware components (e.g., processors, storage devices, communications devices, visual display monitors, etc.) and/or software components (e.g., applications, programs, etc.) hosted by other hardware components.

Operation of these hardware resources may facilitate various functionalities of a data processing system, thereby causing the computer implemented services to be provided by the data processing system. Furthermore, a quantity and/or a type of the provided computer implemented services may depend on functionalities facilitated by a specific operation of the hardware resources (and therefore, of the data processing system).

For example, operation of at least a portion of the hardware resources may support execution of applications (e.g., software components) hosted by the data processing system, a type and/or a quantity of the applications being based on the operation. In some cases, this operation of the at least a portion of the hardware resources may be necessary (e.g., required) to support the execution of the applications and/or to provide a specific type and/or a specific quantity of the computer implemented services (e.g., as desired by a user of the data processing system).

However, the data processing system may be subject to malicious activity, the malicious activity increasing a likelihood of the computer implemented services being negatively impacted (e.g., the services being delayed and/or prevented entirely). This malicious activity may include, for example, gaining access into an interior of the data processing system (e.g., into an interior of a chassis/enclosure that houses the hardware resources) by a malicious and/or otherwise unauthorized (e.g., unauthorized by a user of and/or an authority of the data processing system) entity.

This entity, once having gained the access, may perform any manner of actions that affect the hardware resources' operation such that these resources may not operate in a manner conducive to providing the computer implemented services as desired by the user. In doing so, the data processing system's ability to provide the computer implemented services as desired may be degraded.

To mitigate these negative impacts caused by, for example, the entity gaining such access into the interior of the data processing system, the data processing system may be at least partially equipped with a detection mechanism. This detection mechanism may provide its functionality of allowing the data processing system to identify an intrusion into its own interior. Based on this identification, an action set may be performed to manage the data processing system's security based on the identification. Furthermore, this detection mechanism may include a flow path that relies on more than one portion of the data processing system maintaining contact, thereby making manipulation and/or a breach into the interior less likely to be accomplished without triggering the detection mechanism.

In an embodiment, a method for managing a data processing system using integrated chassis intrusion detection.

The method may include identifying, using a detection mechanism, an occurrence of an event indicating that intrusion into an interior of a chassis of the data processing system are to be monitored; based on the occurrence of the event: monitoring, using a flow path of the detection mechanism, for an intrusion into the interior of the chassis, the flow path may include a first portion secured to a first portion of the chassis and a second portion secured to a circuit card positioned in the interior of the chassis, the first portion and the second portion being electrically connected while the first portion of the chassis is attached to a second portion of the chassis, and the first portion and the second portion being electrically disconnected while the first portion of the chassis is not attached to the second portion of the chassis; and in an instance of the monitoring where an intrusion into the interior of the chassis is identified: performing, based on a policy keyed to the intrusion, an action set to mitigate risk of undesired operation of the data processing system due to the intrusion.

The first portion may include a metallization pattern applied to a feature of the first portion of the chassis.

The feature may include a screw boss, and the metallization pattern may be applied to a portion of the screw boss on which the circuit card rests while the first portion of the chassis is attached to the second portion of the chassis.

The second portion may include a first metallization pattern; and a second metallization pattern that is not electrically connected to the first metallization pattern.

The metallization pattern of the first portion may be adapted to electrically connect the first metallization pattern to the second metallization pattern while the first portion of chassis is attached to the second portion of the chassis.

The detection mechanism may include a detection circuit adapted to detect whether the first metallization pattern is electrically connected to the second metallization pattern.

The detection circuit may be adapted to indicate, after the first metallization pattern and the second metallization pattern have transitioned from being electrically connected to being electrically disconnected, that the intrusion into the chassis has occurred.

The first metallization pattern and the second metallization pattern may be, at least in part, extended from a surface of the circuit card to fill in a gap between the first metallization pattern and the second metallization pattern and the metallization pattern of the first portion while the first portion of the chassis and the second portion of the chassis are attached.

The monitoring for the intrusion may include monitoring an electrical state of the flow path and at least one other flow path; and comparing the monitored electrical states to a criteria to identify whether the intrusion has occurred.

The criteria may specify that all electrical states must be open circuits for it to be concluded that the intrusion has occurred.

The criteria may specify that a majority of the electrical states must be open circuits for it to be concluded that the intrusion has occurred.

The criteria may specify that at least one of the electrical states must be an open circuit for it to be concluded that the intrusion has occurred.

The at least one other flow path may be positioned at a different location from the flow path.

In an embodiment, a non-transitory media is provided. The non-transitory media may include instructions that when executed by a processor cause, at least in part, the computer-implemented method to be performed.

In an embodiment, a data processing system is provided. The data processing system may include the non-transitory media and a processor and may, at least in part, perform the method when the computer instructions are executed by the processor.

Turning to FIG. 1A, a block diagram illustrating a system (e.g., data processing system 100) in accordance with an embodiment is shown. The system shown in FIG. 1A may be a distributed system that provides for management of data processing systems that may provide, at least in part, computer implemented services.

The computer implemented services may include any type and quantity of computer implemented services. The computer implemented services may include, for example, database services, data processing services, electronic communication services, and/or any other services that may be provided using one or more computing devices. The computer implemented services may be provided by, for example, data processing system 100, and/or any other type of devices (not shown in FIG. 1A).

Other types of computer implemented services may be provided by the system shown in FIG. 1A without departing from embodiments disclosed herein.

To provide the computer implemented services, the data processing systems (e.g., 100) may include hardware components (e.g., hardware resources). Operation of these hardware components may facilitate various functionalities of a data processing system, thereby causing the computer implemented services to be provided by the data processing system.

For example, operation of at least a portion of the hardware components may support execution of applications (e.g., software components) hosted by the data processing system, a type and/or a quantity of the applications being based on the operation. In some cases, this operation of the at least a portion of the hardware components may be necessary (e.g., required) to support the execution of the applications and/or to provide a specific type and/or a specific quantity of the computer implemented services (e.g., as desired by a user of the data processing system).

However, the data processing system (and therefore, the operation of the hardware components) may be subject to malicious activity, the malicious activity increasing a likelihood of the computer implemented services being negatively impacted (e.g., the services being delayed, not provided as desired by the user, and/or prevented entirely). This malicious activity may include, for example, gaining access into an interior of the data processing system (e.g., into an interior of a chassis/enclosure that at least partially houses the hardware components) by a malicious and/or otherwise unauthorized (e.g., unauthorized by a user of and/or an authority of the data processing system) entity.

This entity, once having gained the access, may perform any manner of actions that affect the hardware components' operation such that these components may not operate in a manner conducive to providing the computer implemented services as desired by the user. In doing so, the data processing system's ability to provide the computer implemented services as desired may be degraded.

In general, embodiments disclosed herein relate to systems, devices, and methods for improving the likelihood of data processing systems being able to provide desired computer implemented services. To do so, negative impacts caused by, for example, the entity gaining such access into the interior of the data processing system may be mitigated and/or otherwise managed. This mitigation of possible negative impacts may include the data processing system being at least partially equipped with a threat detection mechanism. Consequently, by mitigating such negative impacts, the likelihood of providing the desired computer implemented services may be increased.

To provide the above noted functionality, the system of FIG. 1A may include data processing system 100 and detection mechanism 110, each of which is discussed below.

Data processing system 100 may provide, at least in part, computer implemented services. To do so, data processing system 100 may (i) host hardware components adapted to facilitate various functionalities of data processing system 100, and/or (ii) obtain requests from a user and/or other entities to provide desired computer implemented services.

However, in some cases (as previously discussed) data processing system 100 may be subject to malicious activity such as unauthorized access into the interior of data processing system 100. Such unauthorized access may cause any quantity and/or type of negative impacts that impacts the computer implemented services to be provided (e.g., by causing the operation of the hardware components to change).

To mitigate these negative impacts caused by, for example, an entity gaining such access into the interior of the data processing system, the data processing system may be at least partially equipped with detection mechanism 110.

Detection mechanism 110 may allow data processing system 100 to identify an intrusion into its own interior. Based on this identification, an action set may be performed to manage security of data processing system 100. Furthermore, detection mechanism 110 may include a flow path (discussed further with regard to FIG. 1B) that relies on more than one portion of the data processing system maintaining contact (e.g., a first portion of a chassis of data processing system 100 and a second portion of the chassis), thereby making manipulation and/or a breach into the interior less likely to be accomplished without triggering the detection mechanism.

For additional information regarding detection mechanism 110 and the flow path, refer to FIG. 1B, below.

Figure 1B:
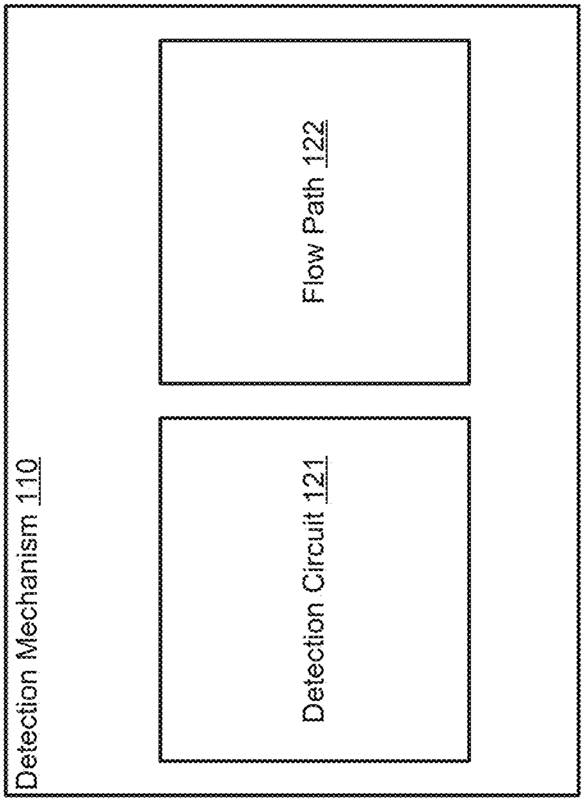

Turning to FIG. 1B, a block diagram illustrating an example detection mechanism in accordance with an embodiment is shown. Detection mechanism 110 may facilitate identification of an intrusion into an interior of an encloser (e.g., part of a chassis) of data processing system 100.

To provide its above noted functionality, detection mechanism 110 may include detection circuit 121 and flow path 122, each of which is discussed below.

Flow path 122 may be a path through which electricity may flow from one location to another. For example, flow path 122 may include a first portion and a second portion. These portions may be implemented by (i) a first pattern made from conductive material that is secured to a first portion of the chassis (e.g., of data processing system 100, discussed previously) and (ii) a second pattern made from conductive material that is secured to a circuit card (e.g., a motherboard of data processing system 100) positioned in the interior of the chassis.

The second pattern may include two sub-portions of electrical circuitry that are not electrically connected to one another. In other words, a gap between two portions of the second pattern may exist. These two sub-portions may act as the start and the end of the flow path. The second pattern may be positioned, shaped, and/or otherwise be adapted to electrically connect the two sub-portions while the chassis is secured (e.g., closed). However, when the chassis is not secured (e.g., a door is at least partially opened), the second pattern may be moved away from the two sub-portions resulting in the two sub-portions being electrically disconnected from one another. Accordingly, if flow path 122 is measured while the chassis is insecure, an open circuit may be read (e.g., while a short circuit may be read while the chassis is secure).

Thus, it will be appreciated that the first portion of flow path 122 and the second portion of flow path 122 may be electrically connected (e.g., electricity may flow between the conductive materials, thereby facilitating the flow path) while the first portion of the chassis (e.g., an enclosure door, discussed further below) is attached to (or otherwise positioned with) a second portion of the chassis (e.g., a top shell, also discussed further below), and/or is otherwise in a secured configuration. Furthermore, the first portion of flow path 122 and the second portion of flow path 122 may be electrically disconnected while the first portion of the chassis is not attached (or otherwise in predefined position with respect) to the second portion of the chassis (e.g., the enclosure door and the top shell are at least partially separated from one another and/or otherwise separated from the rest of the chassis).

Therefore, flow path 122 may change electrical states (e.g., in its state regarding a type of the electrical connectivity discussed above) depending on the whether the first portion of the chassis and the second portion of the chassis are secured to one another (and/or are in predetermined positions with respect to one another). Accordingly, detection circuit 121 may use this change in electrical state to infer whether an intrusion has occurred.

Detection circuit 121 may be adapted to detect whether an intrusion into a chassis has occurred. To do so, detection circuit 121 may monitor for changes in the electrical state of flow path 122. If flow path 122 transitions from a short circuit to an open circuit, detection circuit 121 may infer that an intrusion has occurred and notify other entities of such intrusion.

Further, in some cases, multiple detection circuits (and/or a single detection circuit) may monitor the electrical state of multiple flow paths in a chassis. These flow paths may be positioned in different areas. The electrical states of the multiple flow paths may be used to infer whether an intrusion has occurred. For example, detection circuit 121 may infer that intrusion has occurred when (i) any flow path has entered an open state, (ii) at least two flow paths have entered open states, (iii) all of the flow paths have entered open states, and/or various rule sets keyed to the electrical state of the flow paths have been met. The use of various rule sets may, for example, reduce false positives (e.g., open circuits may occur for reasons other than intrusion such as, for example, mechanical failures, temporary open circuits due to vibration/impact/other mechanical events, failure of electrical components, etc.) and/or enable more robust intrusion detection (e.g., bypassing one or multiple flow paths by a malicious actor may not be sufficient to hide occurrences of intrusions).

When an intrusion has been inferred, detection circuit 121 may latch so that it continues to indicate that an intrusion has occurred (e.g., even if the flow paths return to a close/short circuit electrical state). The detection circuit may include a security mechanism requiring security information (e.g., a code) to be used to reset the detection circuit.

To provide its functionality, detection circuit 121 may be implemented, at least in part, by electronics positioned with a circuit card (e.g., a motherboard) of data processing system 100.

For additional information regarding flow path 122, refer to FIGS. 2A-2M.

Figure 3:
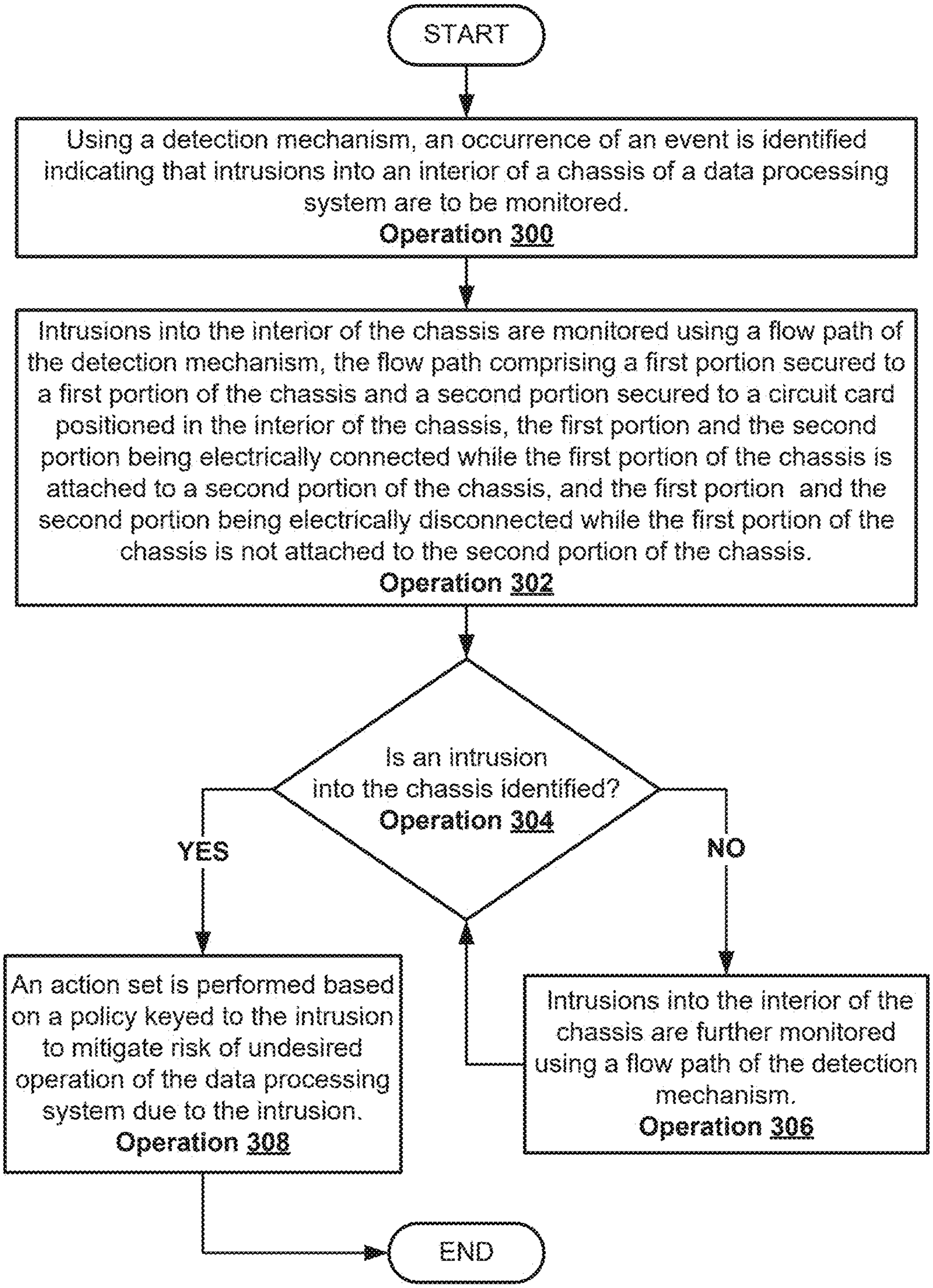
FIG. 3 shows a flow diagram illustrating a method for managing operation of a data processing system based on monitoring an intrusion into the data processing system in accordance with an embodiment.

When providing their functionality, data processing system 100 and/or detection mechanism 110 may perform all, or a portion, of the method shown in FIG. 3. Any of (and/or components thereof) data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIGS. 1A-1B may be operably connected to each other (and/or components not illustrated) with a communication system of data processing system 100.

In an embodiment, this communication system may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIGS. 1A-1B as including a limited number of specific components, a system in accordance with an embodiment may include fewer, additional, and/or different components than those illustrated therein.

Figure 2A:
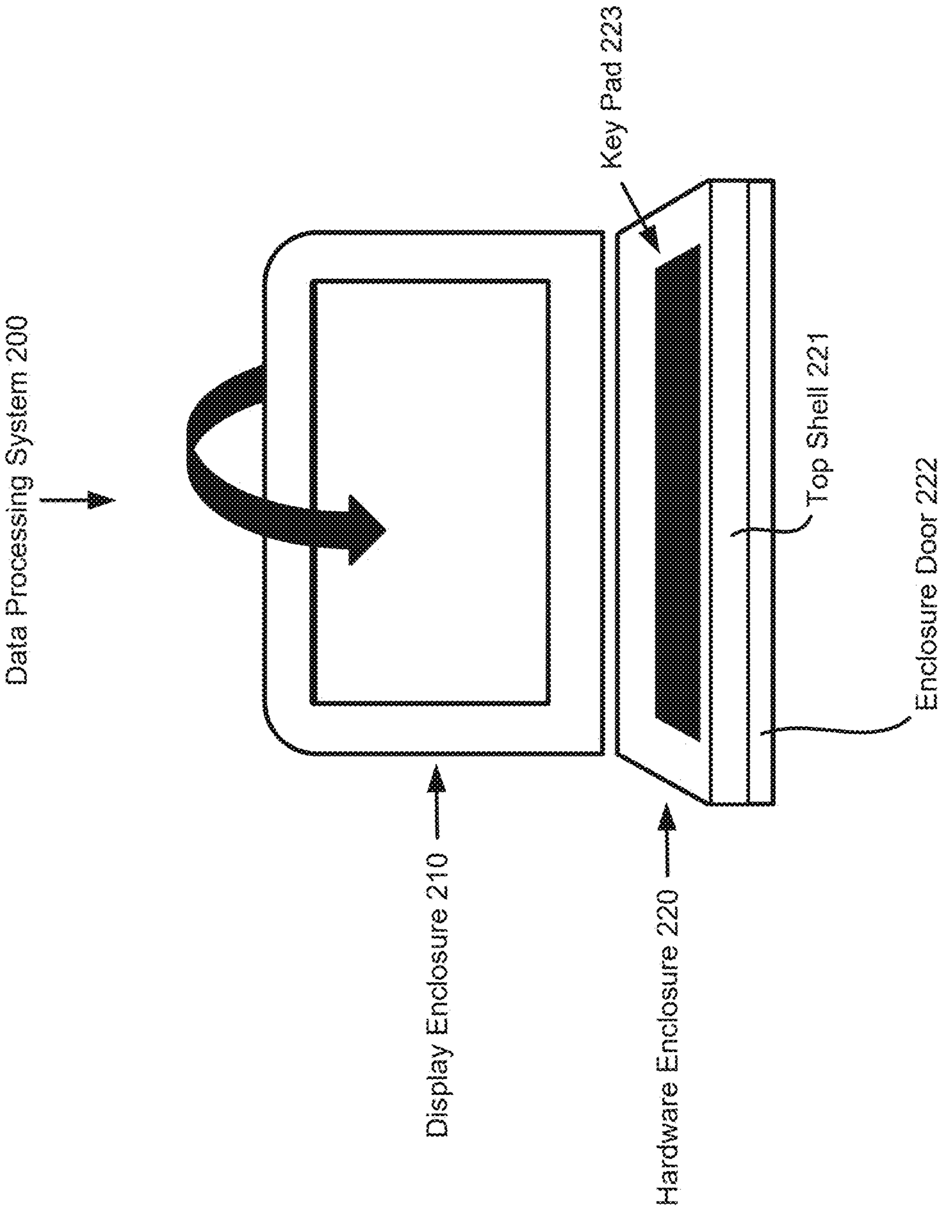
FIGS. 2A-2D show diagrams illustrating a data processing system equipped with a detection mechanism in accordance with an embodiment.

Turning to FIG. 2A, a first diagram illustrating a data processing system (e.g., 200) equipped with a detection mechanism in accordance with an embodiment is shown. The diagram shown in FIG. 2A may be of data processing system 200 (e.g., 100, mentioned above) that is capable of identifying an intrusion into its interior.

As previously discussed, a system (e.g., data processing system 200) may have its interior accessed by an entity that may cause degradation of computer implemented services to be provided.

For example, the system may be a laptop computer, such as data processing system 200 as shown in FIG. 2A. This laptop computer may include display enclosure 210 and hardware enclosure 220, each being a chassis adapted to at least partially house hardware components of data processing system 200. For example, display enclosure 210 may include video and graphics hardware such as a display with built in graphics processing components. Additionally, display enclosure 210 may include electronics connecting (e.g., facilitating communication between hardware housed in display enclosure 210 to hardware components at least partially housed in hardware enclosure 220).

Similarly, hardware enclosure 220 may include hardware components such as key pad 223, at least partially accessible through a top half structure of hardware enclosure 220 (e.g., top shell 221). Furthermore, a bottom half of hardware enclosure 220 (e.g., enclosure door 222) may be positioned with the top half to complete housing functionality of hardware enclosure 220. For example, hardware enclosure 220 may be an implementation of the chassis discussed with regard to FIGS. 1A-1B. As such, enclosure door 222 may be an implementation of the first portion of the chassis, and top shell 221 may be an implementation of the second portion of the chassis.

For example, should the previously mentioned entity want access to the at least partially housed hardware components of data processing system 200, the entity may utilize attachments between top shell 221 and enclosure door 222.

For additional information regarding these attachments, refer to FIG. 2B, below.

Figure 2B:
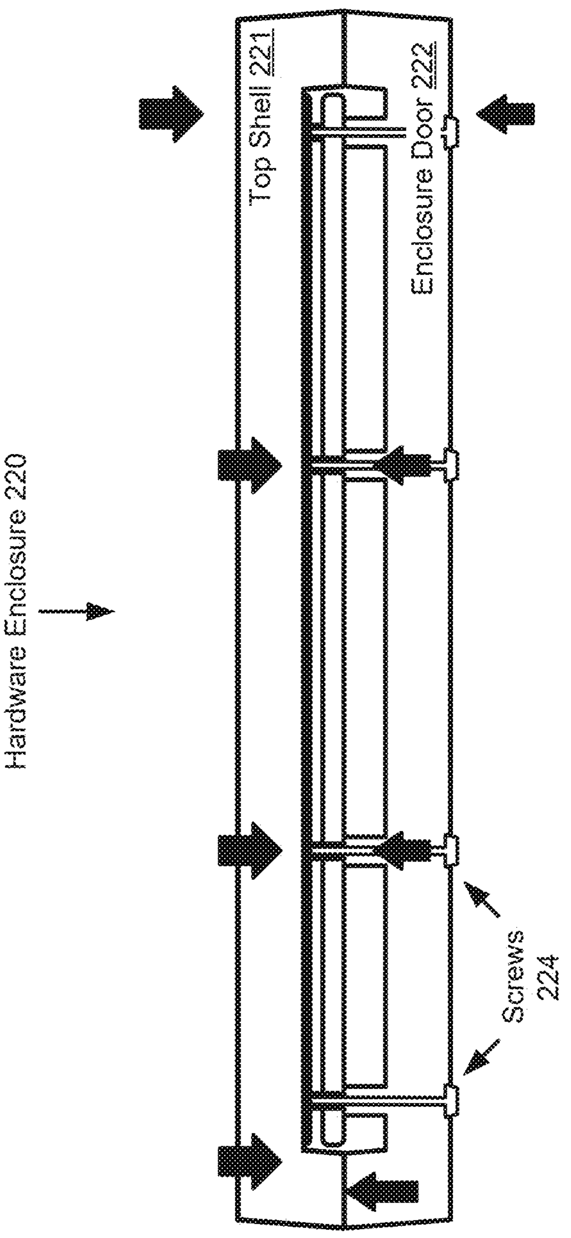

Turning to FIG. 2B, a second diagram illustrating a data processing system (e.g., 200) equipped with a detection mechanism in accordance with an embodiment is shown. The diagram shown in FIG. 2B may be of data processing system 200 (e.g., 100, mentioned above) that is capable of identifying an intrusion into its interior.

As previously discussed, should the previously mentioned entity want access to the at least partially housed hardware components of data processing system 200, the entity may utilize attachments between top shell 221 and enclosure door 222. For example, these attachments may, prior to the entity attempting to gain the access, hold top shell 221 and enclosure door 222 together. The access, once gained by the entity, causing top shell 221 and enclosure door 222 to no longer be held together to a same degree as that prior to the gaining of the access.

For example, black arrows are shown in FIG. 2B to represent the forces caused by the attachments. These forces, to hold hardware enclosure 220, may cause top shell 221 and enclosure door 222 to be held together by causing top shell 221 and enclosure door 222 to apply force against one another (e.g., in opposite directions).

These attachments may be implemented by screws 224, as shown in FIG. 2B. For example, screws 224 may be positioned with screw bosses and circuit board supports as shown in FIG. 2C, discussed below.

Figure 2C:
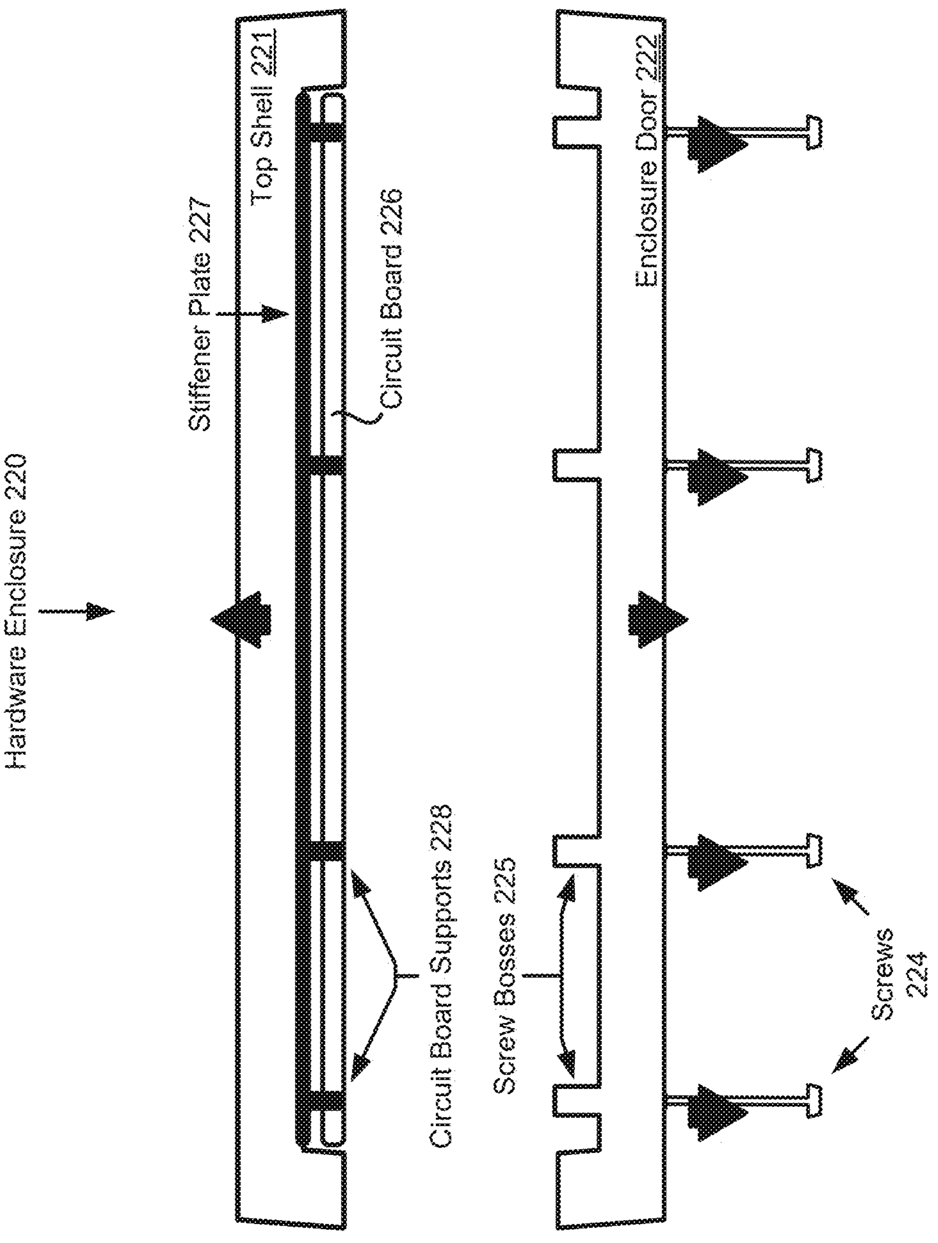

Turning to FIG. 2C, a third diagram illustrating a data processing system (e.g., 200) equipped with a detection mechanism in accordance with an embodiment is shown. The diagram shown in FIG. 2C may be of data processing system 200 (e.g., 100, mentioned above) that is capable of identifying an intrusion into its interior.

As shown in FIG. 2C, at least a portion of hardware components housed in hardware enclosure 220 may be positioned with top shell 221. For example, stiffener plate 227 and circuit board 226 may be positioned with top shell 221. Circuit board 226 may be a motherboard of data processing system 200 (as previously discussed), and stiffener plate 227 may be a structure adapted to provide stability and limit movement of the motherboard when hardware enclosure 220 is held closed as shown in FIG. 2B. This functionality of stiffener plate 227 may be imparted to circuit board 226 using, at least in part, circuit board supports 228.

For example, hardware components such as processors, cables, etc. may be implemented by electronics attached to circuit board 226 (e.g., attached to the motherboard). Circuit board 226 may also have holes (e.g., through-points) that align with circuit board supports 228. Circuit board supports 228 may extend at least partially through the respectively aligned holes to facilitate the limitation of movement of the motherboard within hardware enclosure 220 while the hardware enclosure is being held closed by screws 224.

As previously discussed, screws 224 may be positioned with a feature (e.g., screw bosses 225) and circuit board supports (e.g., 228). For example, enclosure door 222 may include a feature such as through-points from a bottom side of enclosure door 222 to a top side of enclosure door 222.

These through-points may line up with locations of circuit board supports 228. The through-points may be, for example, at least partially threaded so that passage of screws 224 through screw bosses 225 and at least partially into circuit board supports 228 may cause enclosure door 222 and top shell 221 to be pressed towards each other. Thus, while screws 224 are positioned through as mentioned above, hardware enclosure 220 may stay securely closed. Alternatively, if screws 224 are removed (e.g., taken out through screw bosses 225), depicted in FIG. 2C by black arrows to represent the movement of screws 224 so that hardware enclosure 220's interior is able to be breached. For example, the hardware enclosure 220 may open up due to top shell 221 and enclosure door 222 coming apart from one another.

As previously discussed with regard to FIGS. 1A-1B, flow path 122 may be a path through which electricity may flow from one location to another. Therefore, by having (i) a start of flow path 122 and an end of flow path 122 on the circuit board, but the start and end being disconnected from one another, and (ii) the first portion of the flow path on the first portion of the chassis, then when the first portion of the chassis and the second portion of the chassis are connected, the first portion of the flow path may bridge the start and the end of the flow path to enable current flow. Alternatively, if not connected, then the first portion of the flow path may not bridge the start and the end.

Therefore, the electrical state of flow path 122 may change depending on the relative position of top shell 221 and enclosure doors 222 with respect to each other.

For additional information regarding how the electrical state of the flow path may change, refer to FIG. 2D, below.

Figure 2D:
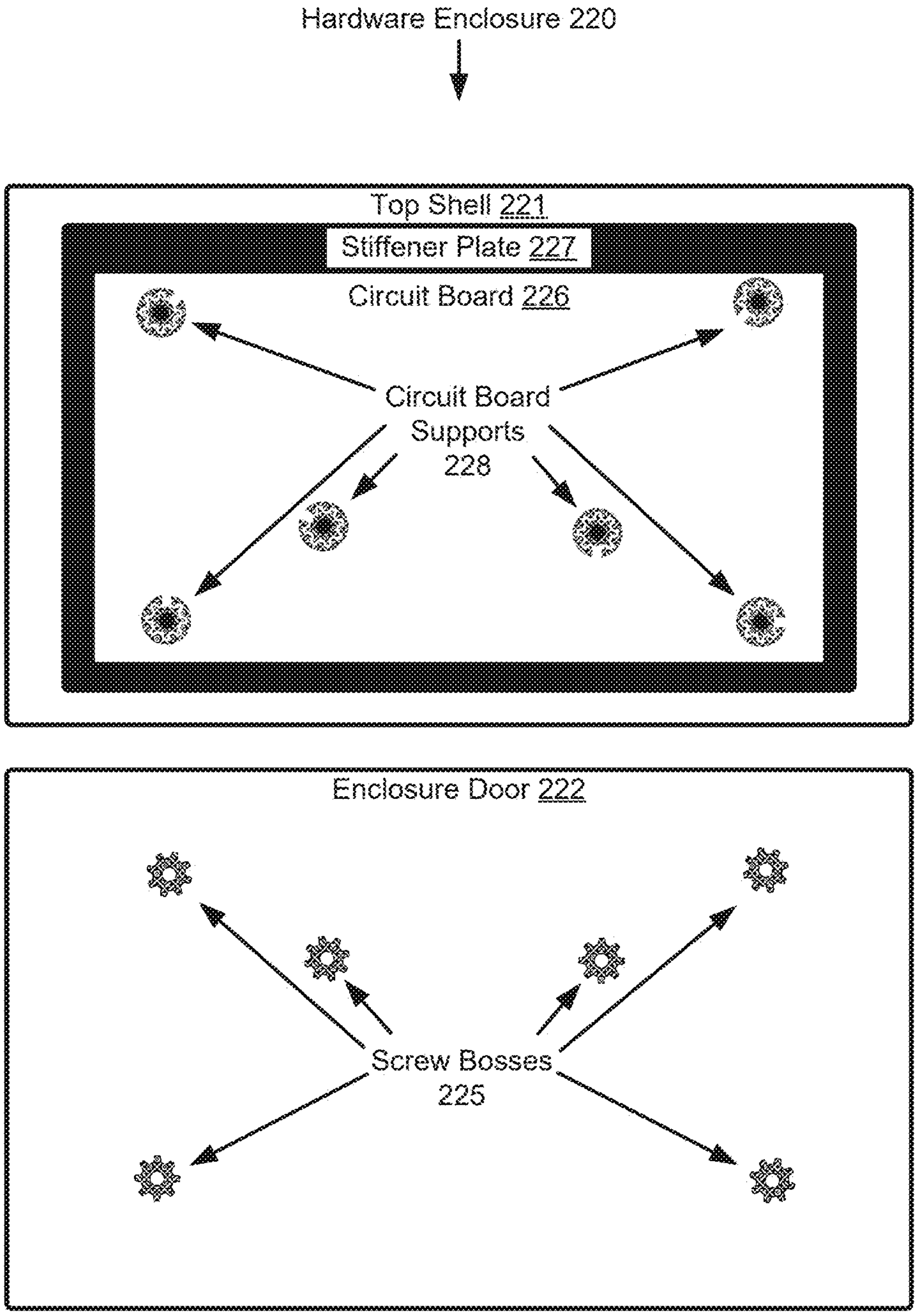

Turning to FIG. 2D, a fourth diagram illustrating a data processing system (e.g., 200) equipped with a detection mechanism in accordance with an embodiment is shown. The diagram shown in FIG. 2D may be of data processing system 200 (e.g., 100, mentioned above) that is capable of identifying an intrusion into its interior, and shown in a state where the top shell and enclosure door have been separated from one another.

As previously discussed with regard to FIGS. 1A-1B, detection Circuit 121 may be adapted to detect the electrical state of the flow path. To provide its functionality, detection circuit 121 may be implemented by electronics positioned with, for example, circuit board 226 that is secured to top shell 221 by stiffener plate 227 (e.g., secured to the second portion of the chassis).

As shown in FIG. 2D, metallization patterns of the flow path may be positioned on the flat surfaces of circuit board 226 and screw bosses 225 that may be extended inward of the interior from top shell 221 and enclosure door 222, respectively. For example, these flat surfaces of circuit board 226 may be located where the circuit board supports 228 are located.

Figure 2E:
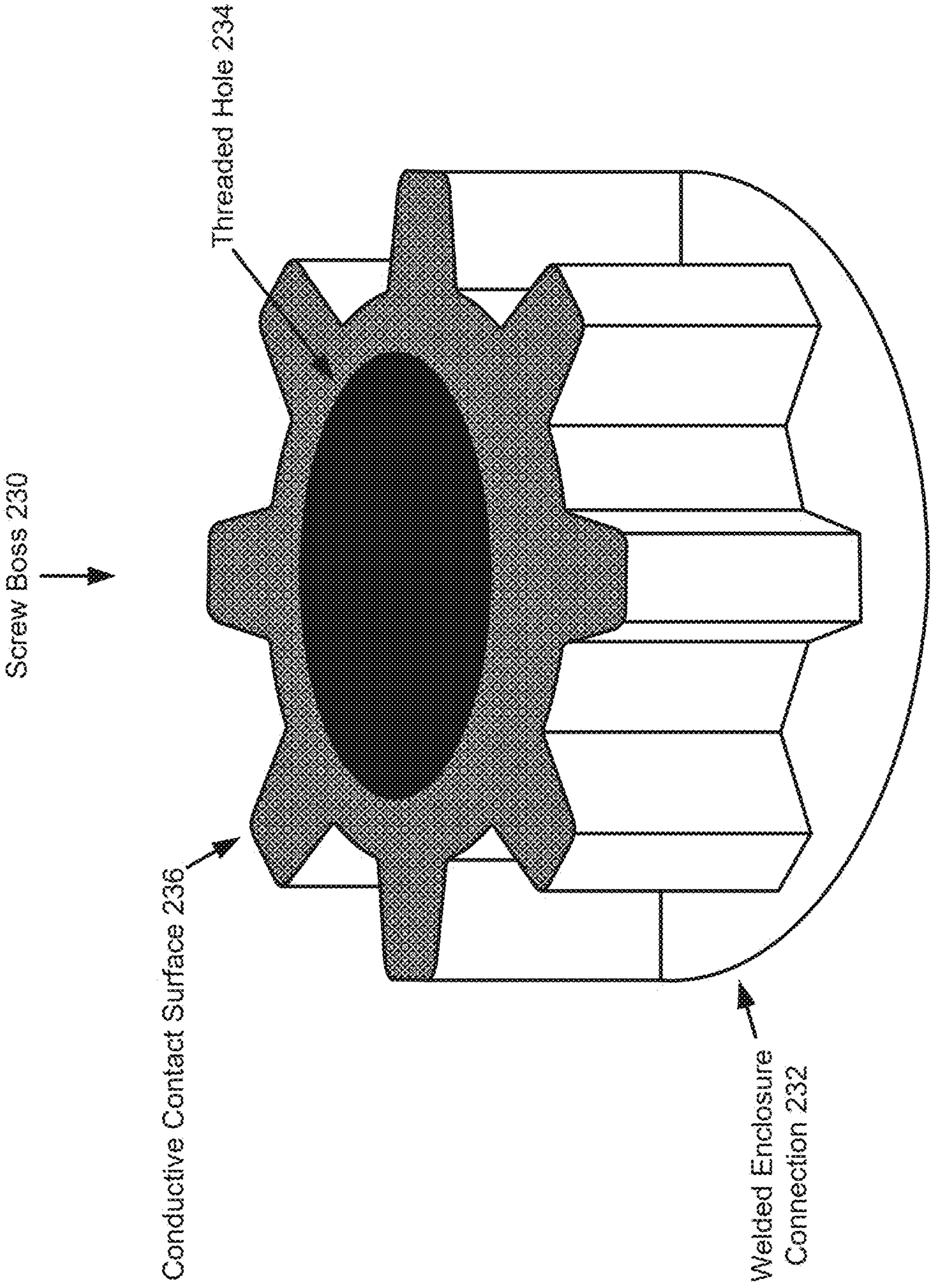
FIGS. 2E-2M show diagrams illustrating portions of a detection mechanism in accordance with an embodiment.

For additional information regarding the extensions from enclosure door 222 (e.g., screw bosses 225), refer to FIG. 2E. For additional information regarding the metallization patterns, refer to FIGS. 2E-2M.

Turning to FIG. 2E, a first diagram illustrating at least a portion of a detection mechanism of a data processing system (e.g., 200) in accordance with an embodiment is shown. The diagram shown in FIG. 2E may be of at least a portion of a detection mechanism (e.g., 110, mentioned above) that allows for the identification of an intrusion into the interior of data processing system 200.

As previously discussed with regard to FIGS. 1A-1B, metallization patterns may be located on a portion of a chassis of data processing system 100 (e.g., 200) and/or a circuit board. The metallization patterns may provide a start of flow path 122, an end of flow path 122, and/or a middle portion of flow path 122 that bridges the gap between the start and the end (e.g., the first portion of the flow path being the start and the end of flow path 122, and the second portion of the flow path being the middle portion of flow path 122) while the two metallization patterns are positioned and pressed against one another.

This middle portion of the flow path may be implemented with a metallization pattern positioned on a portion of the chassis (e.g., the first portion of the chassis) such as the flat surface(s) on screw bosses (e.g., 230) that are extended from enclosure door 222 (as shown in FIG. 2E).

As shown in FIG. 2E, the middle portion may be, for example, conductive contact surface 236. Conductive contact surface 236 may cover the flat surface of screw boss 230 that is extended away from enclosure door 222.

Screw boss 230 may connect to the rest of enclosure door 222 (e.g., bottom of the page) using welded enclosure connection 232. For example, welded enclosure connection 232 may simply be a connecting edge of two portions of metal and/or plastic injection molding (e.g., connecting enclosure door 222 to screw boss 230). A circular surface area such as threaded hole 234 of the flat surface may not be covered by conductive contact surface 236 and may be a part of the through-point in which one of screws 224 may be manipulated through, as previously discussed.

Figure 2F:
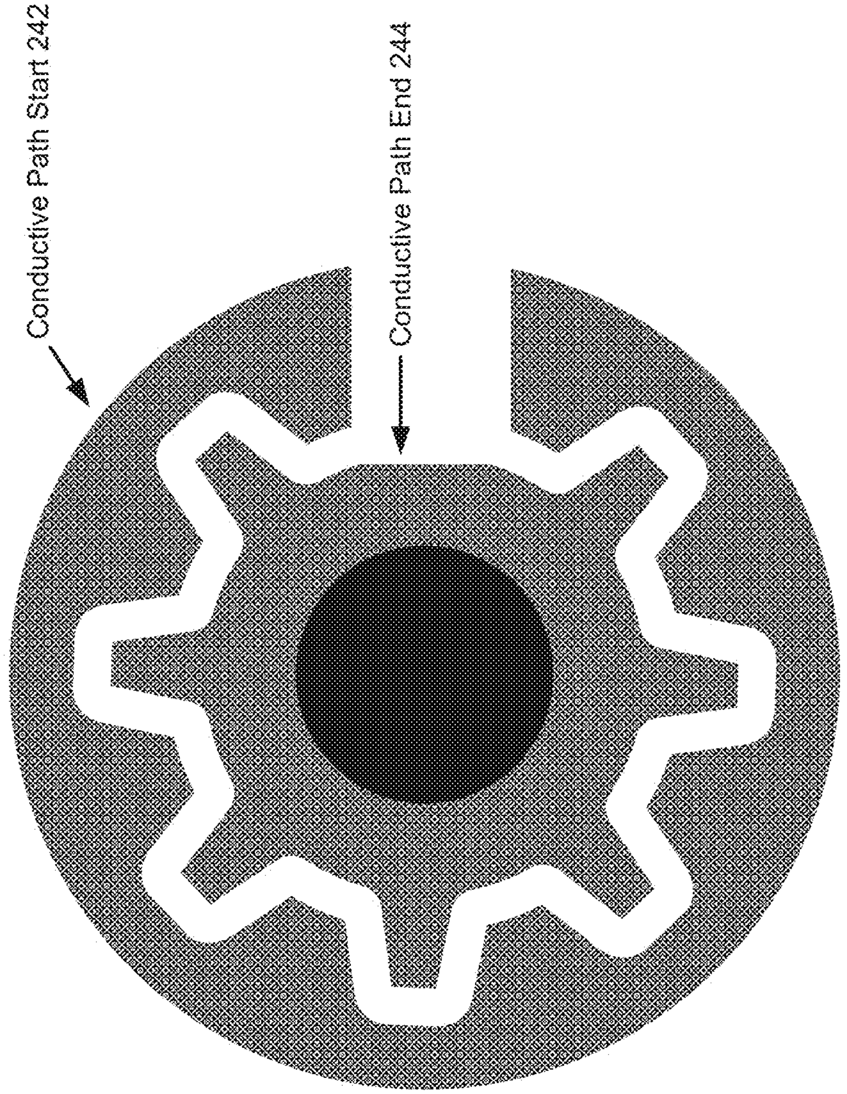

Turning to FIG. 2F, a second diagram illustrating at least a portion of a detection mechanism of a data processing system (e.g., 200) in accordance with an embodiment is shown. The diagram shown in FIG. 2F may be of at least a portion of a detection mechanism (e.g., 110, mentioned above) that allows for the identification of an intrusion into data processing system 200's interior.

As previously discussed, the metallization patterns may be located on a portion of a chassis of data processing system 200 and a circuit board. These metallization patterns may provide a start of flow path 122, an end of flow path 122, and/or a middle portion of flow path 122 that bridges the gap between the start and the end. FIG. 2F shows an example metallization pattern that may be positioned on a circuit board, and may provide a start and an end of the flow path.

For example, the metallization pattern may include conductive path start 242 and conductive path end 244. These sub-portions of the second portion of the flow path may be used as starts and ends to the flow path. As seen in FIG. 2F, these two sub-portions may be separated from one another. Consequently, the two portions may be an open circuit until they are bridged with the first portion of the flow path (e.g., the metallization pattern on top of the screw boss shown in FIG. 2E).

As seen in FIG. 2F, the two sub-portions of the second portion of the flow path may circumscribe a via (e.g., black interior region) or hole in a circuit board. Each of the two sub-portions may have complex shapes to help address, for example, stack up error (e.g., the geared shape may reduce importance of alignment of the first portion of the flow path with the second portion of the flow path for the second portion to bridge the gap between the two sub-portions of the second portion).

While shown with respect to an example pattern, the metallization patterns positioned on the circuit card and chassis may be different without departing from embodiments disclosed herein. FIGS. 2G-2J show examples of such different metallization patterns.

Figure 2G:
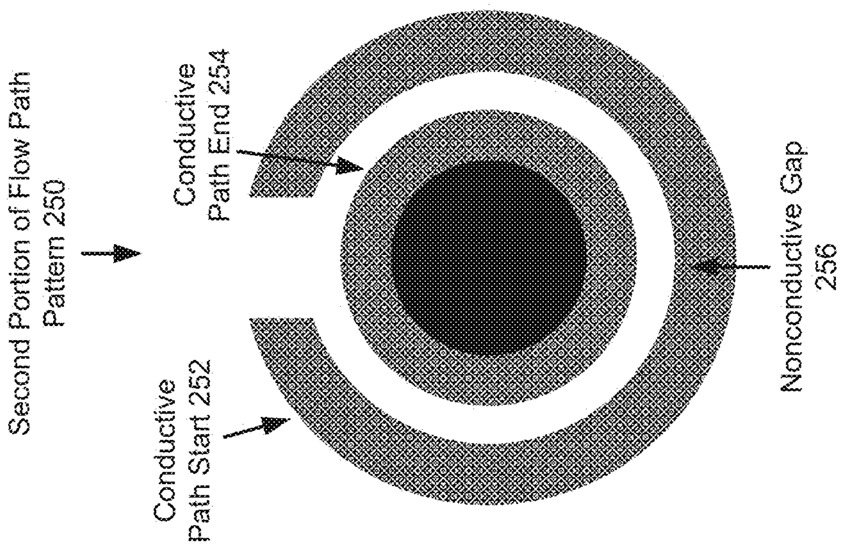
Figure 2H:
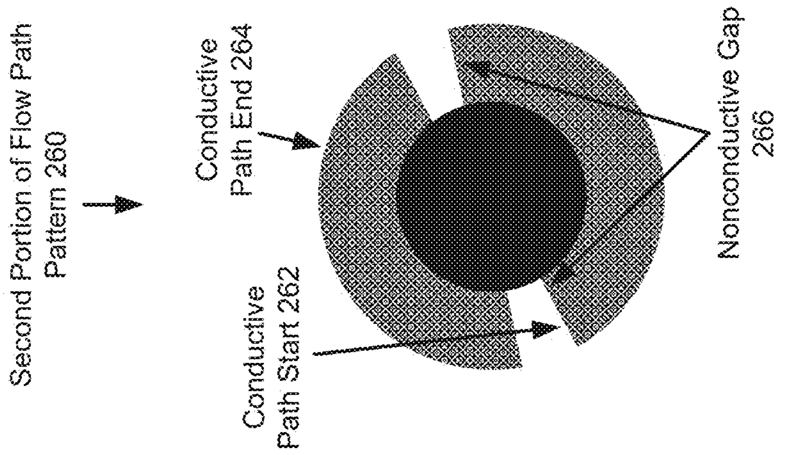
Figure 2I:
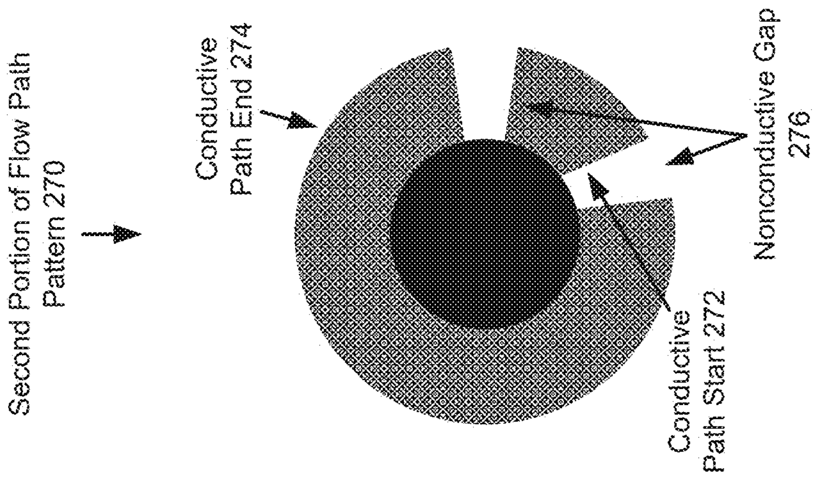

Turning to FIGS. 2G-2I, a third, fourth, and fifth diagram illustrating at least a portion of a detection mechanism of a data processing system (e.g., 200) in accordance with an embodiment is shown. The diagrams shown in FIGS. 2G-2I may be of at least a portion of a detection mechanism (e.g., 110, mentioned above) that allows for the identification of an intrusion into data processing system 200's interior. As previously discussed, metallization patterns may be located on a portion of a chassis of data processing system 200 and a circuit board.

The diagrams shown in FIGS. 2G-2I may depict example metallization patterns for a second portion of the flow path measured by the detection circuit.

For a first example, second portion of flow path pattern 250 is depicted in FIG. 2G. The start of the flow path may be implemented by conductive path start 252, and the end of the flow path may be implemented by conductive path end 254. The start and the end may be separated by nonconductive gap 256, the separation adapted to be bridged by a metallization pattern on a screw boss aligned with open flow path pattern 250 (e.g., conductive contact surface 236 of screw boss 230).

For a second example, second portion of flow path pattern 260 is depicted in FIG. 2H. The start of the flow path may be implemented by conductive path start 262 and the end of the flow path may be implemented by conductive path end 264. The start and the end may be separated by nonconductive gap 266, the separation adapted to be bridged by a metallization pattern on a screw boss aligned with open flow path pattern 260 (e.g., conductive contact surface 236 of screw boss 230).

For a third example, second portion of flow path pattern 270 is depicted in FIG. 2I. The start of the flow path may be implemented by conductive path start 272, and the end of the flow path may be implemented by conductive path end 274. The start and the end may be separated by nonconductive gap 276, the separation adapted to be bridged by a metallization pattern on a screw boss aligned with open flow path pattern (e.g., conductive contact surface 236 of screw boss 230).

Figure 2J:
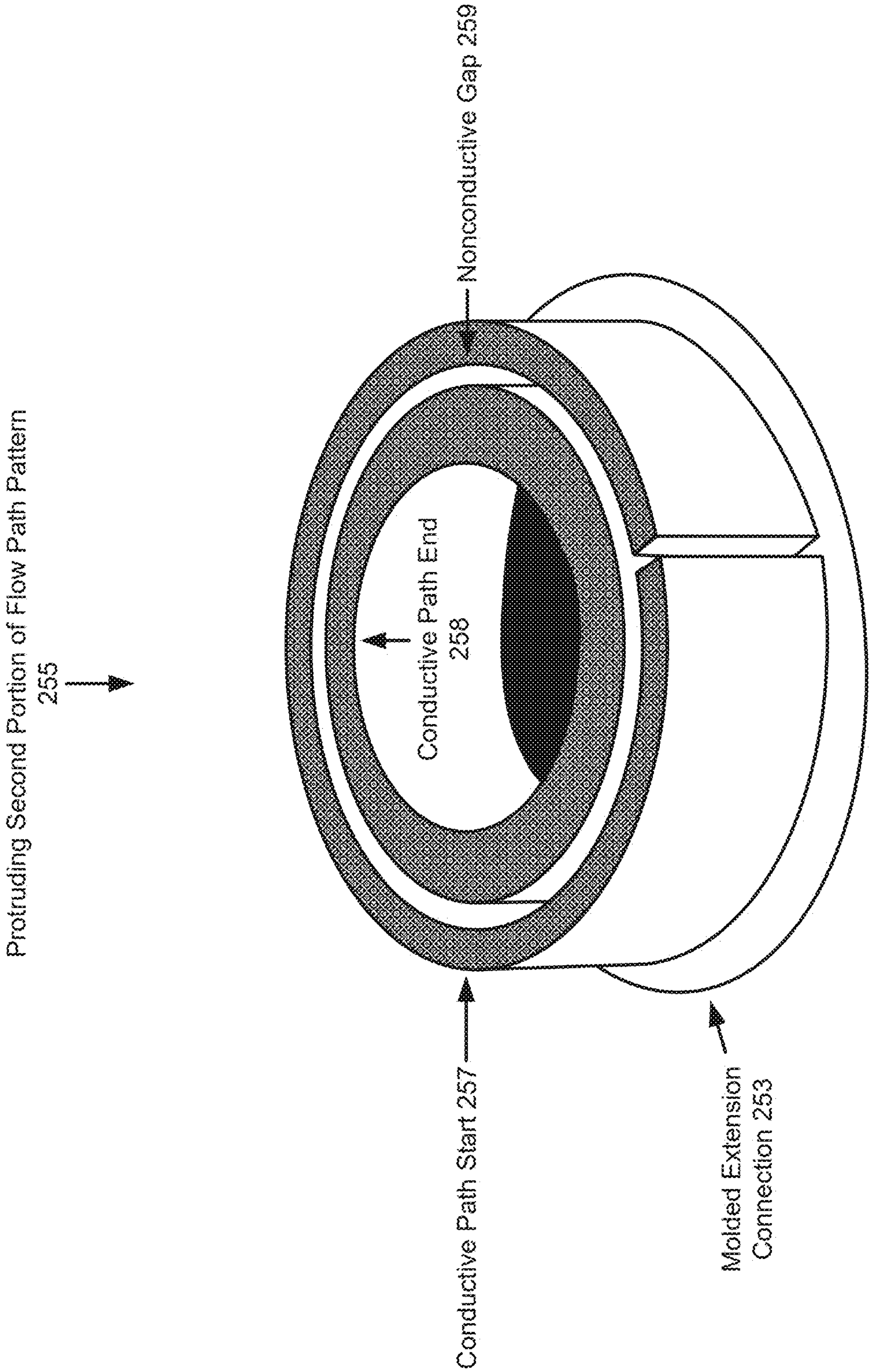

Turning to FIG. 2J, a sixth diagram illustrating at least a portion of a detection mechanism of a data processing system (e.g., 200) in accordance with an embodiment is shown. The diagram shown in FIG. 2J may be of at least a portion of a detection mechanism (e.g., 110, mentioned above) that allows for the identification of an intrusion into data processing system 200's interior.

Although discussed previously with regard to the second portion of the flow path patterns being positioned on a flat surface of, for example, circuit board 226, it will be appreciated that a second portion of the flow path (and therefore the metallization patterns that make up the open flow path) may be on a flat surface (e.g., still surrounding a circuit board support) that is extended away from circuit board 226 or may be an extruded/extended structure as shown, for example, in FIG. 2J. It may also be appreciated that the extended version of the open flow path (e.g., protruding open flow path pattern 255) may be extended away from circuit board 226 similarly to the extension of conductive contact surface 236 away from enclosure door 222 as shown in FIG. 2E.

For example, protruding second portion of flow path pattern 255 is depicted in FIG. 2J. The start of the flow path may be implemented by conductive path start 257, and the end of the flow path may be implemented by conductive path end 258. The start and the end may be separated by nonconductive gap 259.

It will be appreciated that the second portion of flow path pattern discussed in FIG. 2J may appear similar to that shown in FIG. 2G when from a viewpoint directly above the flow patterns (e.g., a zenith relative to the metallization patterns of the open flow path).

Protruding second portion of open flow path pattern 255 may connect to, for example, the rest of circuit board 226 via molded extension connection 253. Molded extension connection 253 may be implemented by a plastic injection molding, metal part, or other structure.

For additional information regarding how separations between the sub-portions of the second portion of the flow path, refer to FIG. 2K below.

Figure 2K:
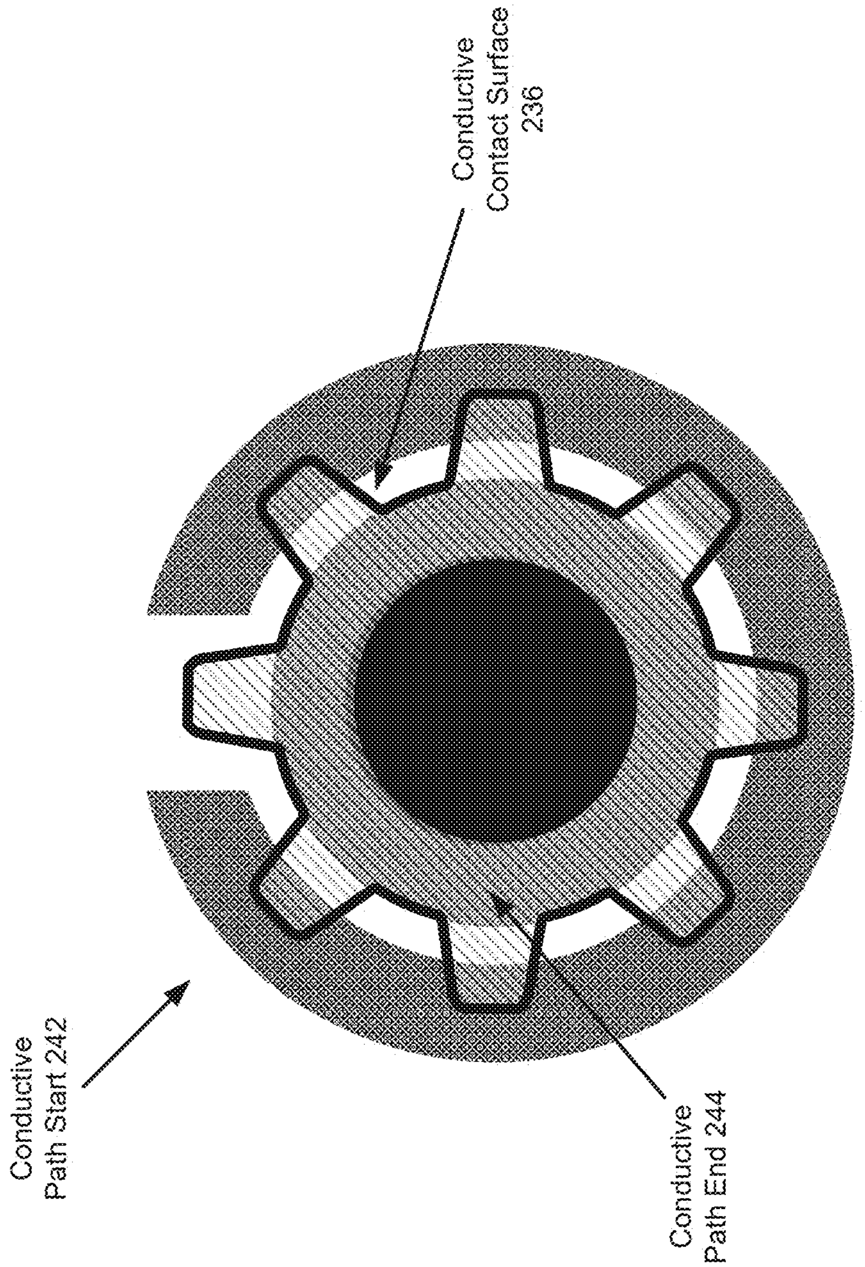

Turning to FIG. 2K, a seventh diagram illustrating at least a portion of a detection mechanism of a data processing system (e.g., 200) in accordance with an embodiment is shown. The diagram shown in FIG. 2K may be of at least a portion of a detection mechanism (e.g., 110, mentioned above) that allows for the identification of an intrusion into the interior of data processing system 200.

As discussed previously with regard to FIG. 2F, once hardware enclosure 220 is secured (e.g., top shell 221 and enclosure door 222 are held together by the screws) the flow path may become closed rather than be open.

When the chassis is secured, conductive contact surface 236 may be pressed against the metallization pattern on the circuit board. Consequently, conductive contact surface 236 may bridge the gap between conductive path start 242 and conductive path end 244. Accordingly, the detection circuit may measure the electrical state of the flow path to infer whether the chassis is secure or insecure. In FIG. 2K, contact surface 236 is illustrated with lined infill, while conductive path start 242 and conductive path end 244 are illustrated with white cross hatch on a black background infill.

For additional information regarding the detection mechanism, refer to FIG. 2M below.

While illustrated in FIG. 2K with an example set of metallization patterns, it will be appreciated that the metallization patterns may be different without departing from embodiments disclosed herein.

Figure 2L:
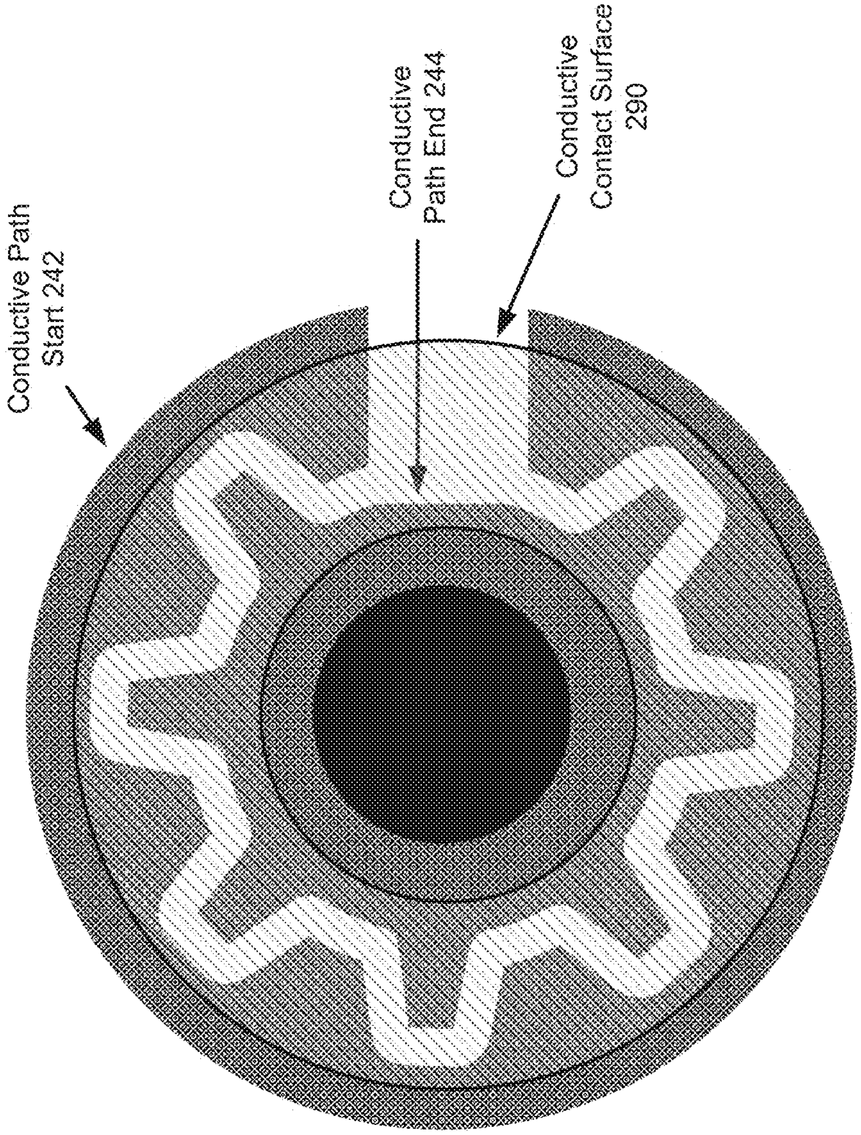

For example, turning to FIG. 2L, a diagram of an alternative set of metallization patterns in accordance with an embodiment is shown. The alternative set may include a metallization pattern positioned on a circuit board similar to that shown in FIG. 2F, and a second metallization pattern in the shape of an annulus positioned on a screw boss or other portion of a chassis.

The annulus may have diameters (e.g., interior, exterior) adapted to bridge the gap between conductive path start 242 and conductive path end 244. Thus, when aligned and pressed with the circuit board, conductive contact surface 290 may close the flow path.

Figure 2M:
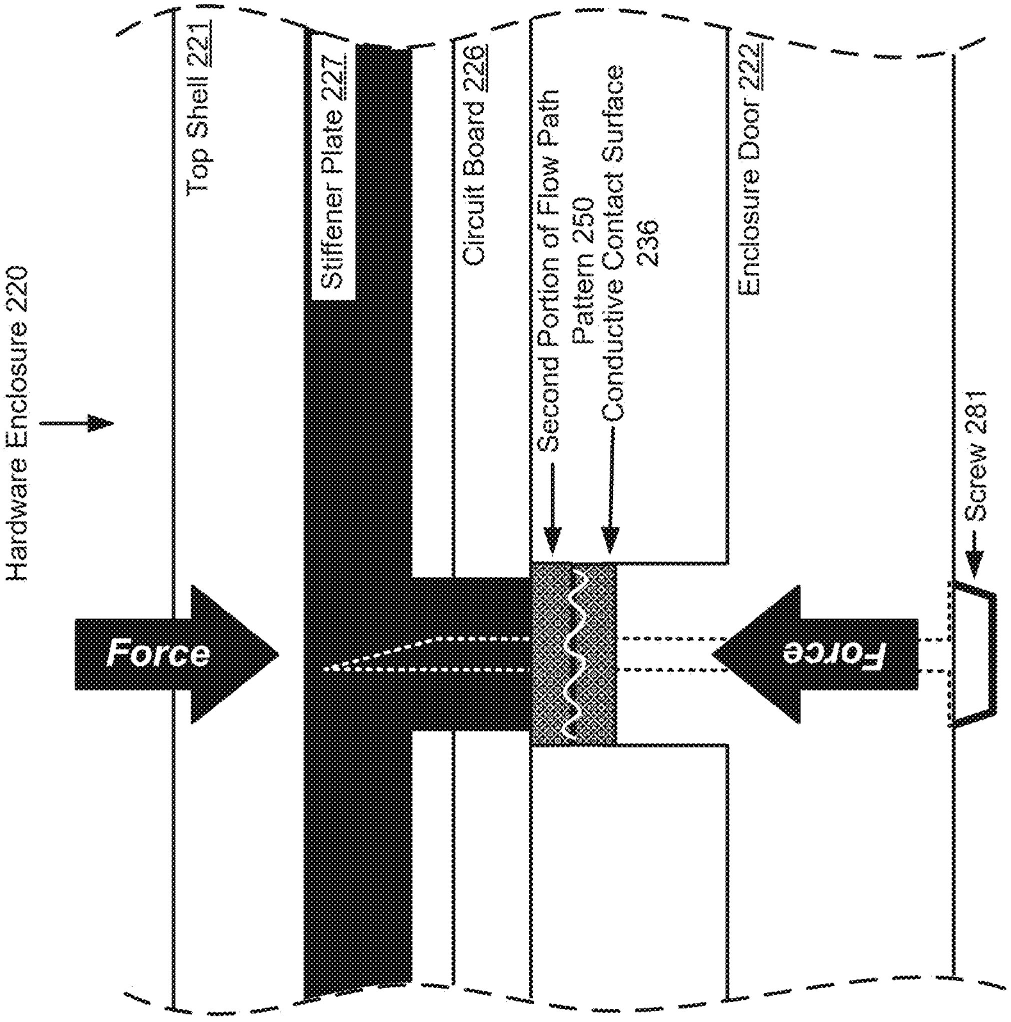

Turning to FIG. 2M, an eighth diagram illustrating at least a portion of a detection mechanism of a data processing system (e.g., 200) in accordance with an embodiment is shown. The diagram shown in FIG. 2M may be of at least a portion of a detection mechanism (e.g., 110, mentioned above) that allows for the identification of an intrusion into the interior of data processing system 200. The viewpoint of FIG. 2M may be an expanded view of that shown in FIG. 2B.

As previously discussed, screws may be used to secure (e.g., hold together) top shell 221 and enclosure door 222 such that hardware enclosure 220 is closed and secured. As shown in FIG. 2M, screw 281 of the screws may cause top shell 221 and enclosure door 222 to apply force to one another as depicted with the black arrows.

Therefore, for example, the second portion of flow path pattern 250 from FIG. 2G and conductive contact surface 236 from FIG. 2E may also apply force on one another by being positioned between the flat surfaces of the circuit board and the screw boss, respectively.

By applying this force, physical contact may be made between conductive contact surface 236 and both a start and an end of second portion of flow path pattern 250, respectively. Thus, electricity may be allowed to flow from the start to the end, depicted using closed flow path 280 (e.g., illustrated as a white wavy line between the opposing force).

Therefore, should the entity (that is discussed in FIGS. 1A-1B) decide to attempt gaining the access into the interior of data processing system 200, the entity may have to overcome the opposing forces that hold hardware enclosure 220 together. However, if the flow path is opened such that the start of the flow path and the end of the flow path may not allow electricity to flow between them, then the detection circuit may provide a change in output (e.g., data indicating a change in input for the detection circuit, the input depending on whether the flow path is open or closed) to the data processing system.

By having a first portion of the flow path on a first portion of the chassis (e.g., hardware enclosure 220) and a second portion of the flow path on the circuit board, a likelihood of the entity being able to open the chassis without breaking the flow path may be decreased. This decrease, in turn, may cause a likelihood of maintaining and providing the computer implemented services to increase through identification and remediation of such intrusions. Thus, this increase may be based on (i) accurate intrusion identification via the detection mechanism (and/or the data processing system), and (ii) execution of an action set based on the accurate intrusion identification for managing security of the data processing system.

Thus, as discussed with regard to FIGS. 2A-2M, a detection mechanism may allow for monitoring of an intrusion into a data processing system. This monitoring may therefore allow for an informed decision to be made regarding security of the data processing system. For example, such a decision may be made as discussed with regard to FIG. 3, discussed further below. By allowing this informed decision to be made, a likelihood of providing computer implemented services as desired by a user of the data processing system may be increased, regardless of an intrusion into the data processing system occurring.

While illustrated in FIGS. 2A-2M with a limited number of specific components, a system may include additional, fewer, and/or different components without departing from embodiments disclosed herein.

As discussed above, the components of FIGS. 2A-2M may facilitate and/or perform various functionalities to manage data processing systems (e.g., by detecting an intrusion into an interior of the data processing systems). FIG. 3 illustrates methods that may be facilitated and/or performed by the components of FIG. 2A-2M.

In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for managing operation of a data processing system based on monitoring an intrusion into the data processing system in accordance with an embodiment is shown. The method may be performed, for example, by a detection mechanism, a data processing system, and/or any other entity.

At operation 300, an occurrence of an event is identified using a detection mechanism indicating that an intrusion into an interior of a chassis of a data processing system are to be monitored. The occurrence of the event may be identified by facilitating a flow of electricity between a start of a flow path and an end of the flow path for the first time. To do so, physical contact may be made between the two portions of the chassis, for example, during manufacturing of the data processing system.

At operation 302, an intrusion into the interior of the chassis is monitored using a flow path of the detection mechanism. The flow path may include a first portion secured to a first portion of the chassis and a second portion secured to a circuit card positioned in the interior of the chassis. The first portion of the flow path and the second portion of the flow path may be electrically connected while the first portion of the chassis is attached to a second portion of the chassis. The first portion of the flow path and the second portion of the flow path may be electrically disconnected while the first portion of the chassis is not attached to the second portion of the chassis. The intrusion may be monitored by (e.g., actively) recording and/or processing output provided by a detection circuit which uses the flow path over a period of time. For example, these outputs may indicate electrical states associated with respective flow paths. A change in electrical state of a flow path may be an indicator of an intrusion into the chassis. As previously discussed, a closed flow path may only facilitate electrical flow while the portions of the chassis are securely held together, for example, by the screws discussed previously. An open flow path may only be facilitated when the portions of the chassis move away from one another as the chassis becomes no longer securely held and such that metallization patterns of the flow path of the detection mechanism no longer make physical contact with one another.

At operation 304, a determination is made regarding whether an intrusion into the chassis is identified. This determination may be made by receiving, by, for example, the data processing system, a signal from the detection circuit. This signal may be one of two types of output of the detection circuit, the first type indicating a closed flow path and the second type indicating an open flow path. For example, if the first type of output is obtained, then the first type of output may indicate a closed flow path. Based on the closed flow path, it may be determined that the chassis has had no intrusion due to there not being any indication of disconnecting portions of the chassis. Similarly, for example, if the second type of output is obtained, then the second type of output may indicate an open flow path. Based on the open flow path, it may be determined that the chassis has had at least one intrusion due to an indication of the portions of the chassis at least partially disconnected from one another.

If determined that an intrusion into the chassis is not identified, the method may continue to operation 306. Otherwise, the method may continue to 308.

It will be appreciated that in some cases, the data processing system may be equipped with a number of redundant detection circuits that facilitate monitoring of respective flow paths. Based on the number of redundant detection circuits, there may be various criteria to determine whether the intrusion into the chassis has occurred while also mitigating, for example, false positives that may occur.

For example, in a data processing system that has multiple instances of the detection mechanism with independent detection circuits and flow paths, (i) the criteria may specify that all electrical states must be open circuits for it to be concluded that the intrusion has occurred (e.g., all of the detection circuits must provide the second type of output to the data processing system), (ii) the criteria may specify that a majority of the electrical states must be open circuits for it to be concluded that the intrusion has occurred (e.g., a majority of the detection circuits must provide the second type of output to the data processing system), (iii) the criteria may specify that at least one of the electrical states must be an open circuits for it to be concluded that the intrusion has occurred (e.g., at least one of the detection circuits must provide the second type of output to the data processing system), To provide this functionality of redundantly monitoring for the intrusion, each detection circuit of the number of detections circuits (along with a corresponding flow path) may be positioned at a different locations from one another. For example, the detection circuits and flow paths may be positioned as shown in FIG. 2D, the positioned being aligned with circuit board supports 228 and screw bosses 225.

At operation 306, the intrusion into the interior of the chassis is further monitored using the flow path of the detection mechanism. An intrusion into the interior of the chassis may be further monitored via such processes as that described with respect to operation 302.

Following operation 306, the method may return to operation 304.

It will be appreciated that, for example, the method may repeat (e.g., loop through) operation 306, back to operation 304, to operation 306, until the intrusion into the interior of the chassis is identified. Upon which (e.g., upon an occurrence of the intrusion), the method may proceed to operation 308 from operation 304 when the intrusion into the interior of the chassis is identified when, for example, the detection circuit provides the second type of output to the data processing system. In doing so, constant monitoring may be facilitated in order to not miss an occurrence of the intrusion.

Returning to operation 304, the method may proceed to operation 308 when the intrusion into the interior of the chassis is identified.

At operation 308, an action set is performed based on a policy keyed to the intrusion to mitigate risk of undesired operation of the data processing system due to the intrusion. The action set may be performed by executing one or more commands keyed to the second type of output (e.g., obtained via a lookup process, solution generation algorithm, etc.) to mitigate negative impacts on computer implemented services provided by the data processing system, the negative impacts being caused by intrusion into the interior of the chassis by the entity. For example, the policy may associate the second type of output with various series of commands to be executed by the data processing system. For example, these various series of commands may include (i) backing up imperative and/or private information to a hard drive or, for example, a cloud database before locking, encrypting, and/or corrupting the data stored locally on the data processing system, (ii) initiating a special shutdown process that prevents further startup unless credentials associated with an authority of high security clearance (e.g., security clearance associated with the data processing system) are provided, (iii) and/or any other series of executable commands not to be limited to embodiments herein.

The method may end following operation 308.

Thus, using the method illustrated in FIG. 3, embodiments disclosed herein may manage data processing systems to increase a likelihood of providing desired computer implemented services while monitoring an intrusion into the data processing systems.

Any of the processes and/or components illustrated in and/or discussed with regard to FIGS. 1A-3 may be implemented with and/or used in conjunction with one or more computing devices.

Figure 4:
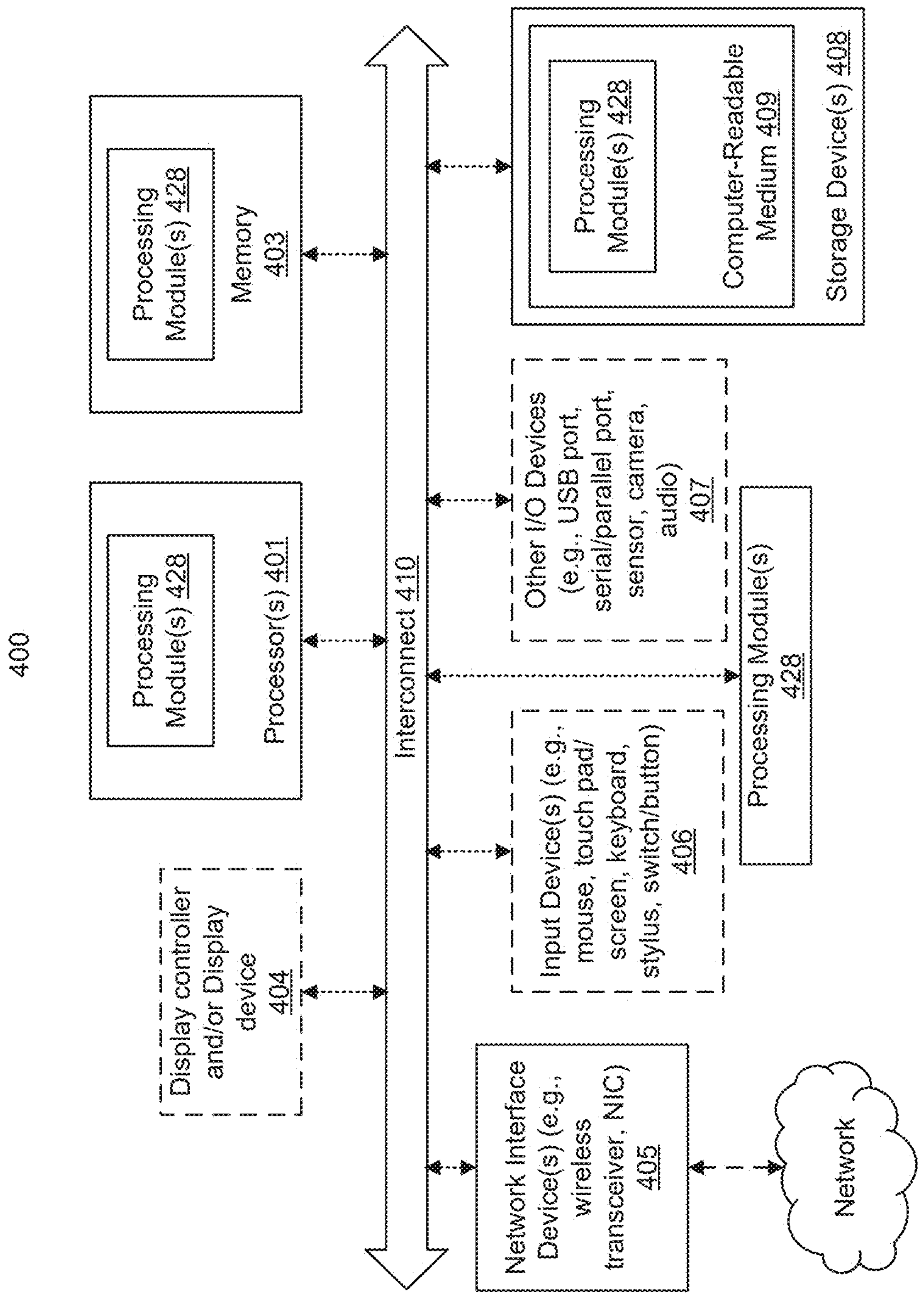
FIG. 4 shows a block diagram illustrating a data processing system in accordance with an embodiment.

Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high-level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random-access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

identifying, using a detection mechanism, an occurrence of an event indicating that intrusion into an interior of a chassis of the data processing system are to be monitored;

based on the occurrence of the event:

monitoring, using a flow path of the detection mechanism, for an intrusion into the interior of the chassis, the flow path comprising a first portion of the flow path secured to a first portion of the chassis and a second portion of the flow path secured to a circuit card positioned in the interior of the chassis, the first portion of the flow path and the second portion of the flow path being electrically connected while the first portion of the chassis is attached to a second portion of the chassis, and the first portion of the flow path and the second portion of the flow path being electrically disconnected while the first portion of the chassis is not attached to the second portion of the chassis; and in an instance of the monitoring where an intrusion into the interior of the chassis is identified:

performing, based on a policy keyed to the intrusion, an action set to mitigate risk of undesired operation of the data processing system due to the intrusion, wherein the first portion of the flow path comprises a metallization pattern applied to a feature of the first portion of the chassis, wherein the second portion of the flow path comprises:

a first metallization pattern; and a second metallization pattern that is not electrically connected to the first metallization pattern, and wherein the first metallization pattern and the second metallization pattern are, at least in part, extended from a surface of the circuit card to fill in a gap between the first metallization pattern and the second metallization pattern and the metallization pattern of the first portion of the flow path while the first portion of the chassis and the second portion of the chassis are attached.

2. The method of claim 1, wherein the feature comprises a screw boss, and the metallization pattern is applied to a portion of the screw boss on which the circuit card rests while the first portion of the chassis is attached to the second portion of the chassis.

3. The method of claim 1, wherein the metallization pattern of the first portion of the flow path is adapted to electrically connect the first metallization pattern to the second metallization pattern while the first portion of the chassis is attached to the second portion of the chassis.

4. The method of claim 3, wherein the detection mechanism comprises:

a detection circuit adapted to detect whether the first metallization pattern is electrically connected to the second metallization pattern.

5. The method of claim 4, wherein the detection circuit is adapted to indicate, after the first metallization pattern and the second metallization pattern have transitioned from being electrically connected to being electrically disconnected, that the intrusion into the chassis has occurred.

6. The method of claim 1, wherein the monitoring for the intrusion comprises:

monitoring electrical states of the flow path and at least one other flow path; and comparing the monitored electrical states to a criteria to identify whether the intrusion has occurred.

7. The method of claim 6, wherein the criteria specifies that all electrical states must be open circuits for it to be concluded that the intrusion has occurred.

8. The method of claim 6, wherein the criteria specifies that a majority of the monitored electrical states must be open circuits for it to be concluded that the intrusion has occurred.

9. The method of claim 6, wherein the criteria specifies that at least one of the monitored electrical states must be an open circuit for it to be concluded that the intrusion has occurred.

10. The method of claim 6, wherein the at least one other flow path is positioned at a different location from the flow path.

11. A non-transitory machine-readable medium having instructions stored therein, which when executed by a processor, cause the processor to perform operations for managing a data processing system, the operations comprising:

identifying, using a detection mechanism, an occurrence of an event indicating that intrusion into an interior of a chassis of the data processing system are to be monitored;

based on the occurrence of the event:

monitoring, using a flow path of the detection mechanism, for an intrusion into the interior of the chassis, the flow path comprising a first portion of the flow path secured to a first portion of the chassis and a second portion of the flow path secured to a circuit card positioned in the interior of the chassis, the first portion of the flow path and the second portion of the flow path being electrically connected while the first portion of the chassis is attached to a second portion of the chassis, and the first portion of the flow path and the second portion of the flow path being electrically disconnected while the first portion of the chassis is not attached to the second portion of the chassis; and in an instance of the monitoring where an intrusion into the interior of the chassis is identified:

performing, based on a policy keyed to the intrusion, an action set to mitigate risk of undesired operation of the data processing system due to the intrusion, wherein the first portion of the flow path comprises a metallization pattern applied to a feature of the first portion of the chassis, wherein the second portion of the flow path comprises:

a first metallization pattern; and a second metallization pattern that is not electrically connected to the first metallization pattern, and wherein the first metallization pattern and the second metallization pattern are, at least in part, extended from a surface of the circuit card to fill in a gap between the first metallization pattern and the second metallization pattern and the metallization pattern of the first portion of the flow path while the first portion of the chassis and the second portion of the chassis are attached.

12. The non-transitory machine-readable medium of claim 11, wherein the metallization pattern of the first portion of the flow path is adapted to electrically connect the first metallization pattern to the second metallization pattern while the first portion of the chassis is attached to the second portion of the chassis.

13. The non-transitory machine-readable medium of claim 12, wherein the detection mechanism comprises:

a detection circuit adapted to detect whether the first metallization pattern is electrically connected to the second metallization pattern.

14. The non-transitory machine-readable medium of claim 11, wherein the monitoring for the intrusion comprises:

monitoring an electrical state of the flow path and at least one other flow path; and comparing the monitored electrical states to a criteria to identify whether the intrusion has occurred.

15. A data processing system, comprising:

a processor; and a memory coupled to the processor to store instructions, which when executed by the processor, cause the processor to perform operations for managing the data processing system, the operations comprising:

identifying, using a detection mechanism, an occurrence of an event indicating that intrusion into an interior of a chassis of the data processing system are to be monitored;

based on the occurrence of the event:

monitoring, using a flow path of the detection mechanism, for an intrusion into the interior of the chassis, the flow path comprising a first portion of the flow path secured to a first portion of the chassis and a second portion of the flow path secured to a circuit card positioned in the interior of the chassis, the first portion of the flow path and the second portion of the flow path being electrically connected while the first portion of the chassis is attached to a second portion of the chassis, and the first portion of the flow path and the second portion of the flow path being electrically disconnected while the first portion of the chassis is not attached to the second portion of the chassis; and in an instance of the monitoring where an intrusion into the interior of the chassis is identified:

performing, based on a policy keyed to the intrusion, an action set to mitigate risk of undesired operation of the data processing system due to the intrusion, wherein the first portion of the flow path comprises a metallization pattern applied to a feature of the first portion of the chassis, wherein the second portion of the flow path comprises:

a first metallization pattern; and a second metallization pattern that is not electrically connected to the first metallization pattern, and wherein the first metallization pattern and the second metallization pattern are, at least in part, extended from a surface of the circuit card to fill in a gap between the first metallization pattern and the second metallization pattern and the metallization pattern of the first portion of the flow path while the first portion of the chassis and the second portion of the chassis are attached.

16. The data processing system of claim 15, wherein the monitoring for the intrusion comprises:

monitoring electrical states of the flow path and at least one other flow path; and comparing the monitored electrical states to a criteria to identify whether the intrusion has occurred.

17. The data processing system of claim 16, wherein the criteria specifies that all electrical states must be open circuits for it to be concluded that the intrusion has occurred.

18. The data processing system of claim 16, wherein the criteria specifies that a majority of the monitored electrical states must be open circuits for it to be concluded that the intrusion has occurred.

19. The data processing system of claim 16, wherein the criteria specifies that at least one of the monitored electrical states must be an open circuit for it to be concluded that the intrusion has occurred.

20. The data processing system of claim 16, wherein the at least one other flow path is positioned at a different location from the flow path.

* * * * *